Aug. 18, 1936.　　　　R. W. BROWN　　　　2,051,780

MAGNETIC THICKNESS GAUGE

Filed Dec. 3, 1931　　　　8 Sheets-Sheet 1

INVENTOR
Roy W. Brown
BY
Ely & Barrow
ATTORNEYS

Aug. 18, 1936.    R. W. BROWN    2,051,780
MAGNETIC THICKNESS GAUGE
Filed Dec. 3, 1931    8 Sheets-Sheet 2
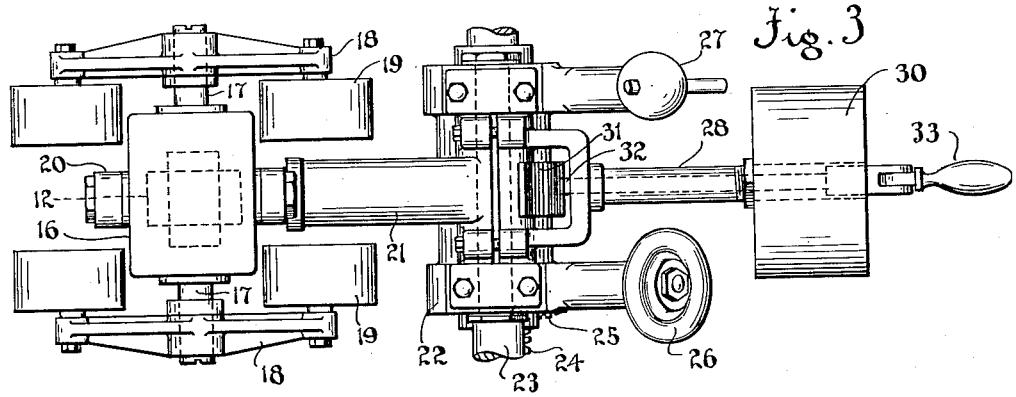
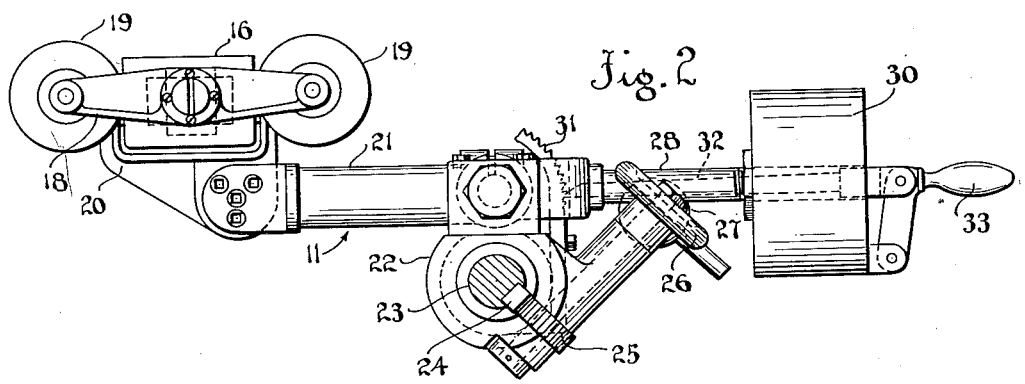
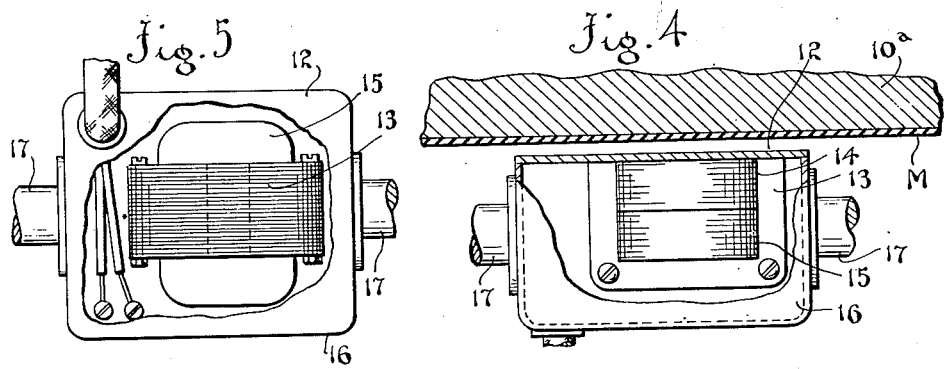
INVENTOR
Roy W. Brown
BY
ATTORNEYS Aug. 18, 1936.    R. W. BROWN    2,051,780
MAGNETIC THICKNESS GAUGE
Filed Dec. 3, 1931    8 Sheets-Sheet 3

INVENTOR
Roy W. Brown
BY
Ely & Barrow
ATTORNEYS

Aug. 18, 1936.                R. W. BROWN                2,051,780
                        MAGNETIC THICKNESS GAUGE
                        Filed Dec. 3, 1931        8 Sheets-Sheet 4
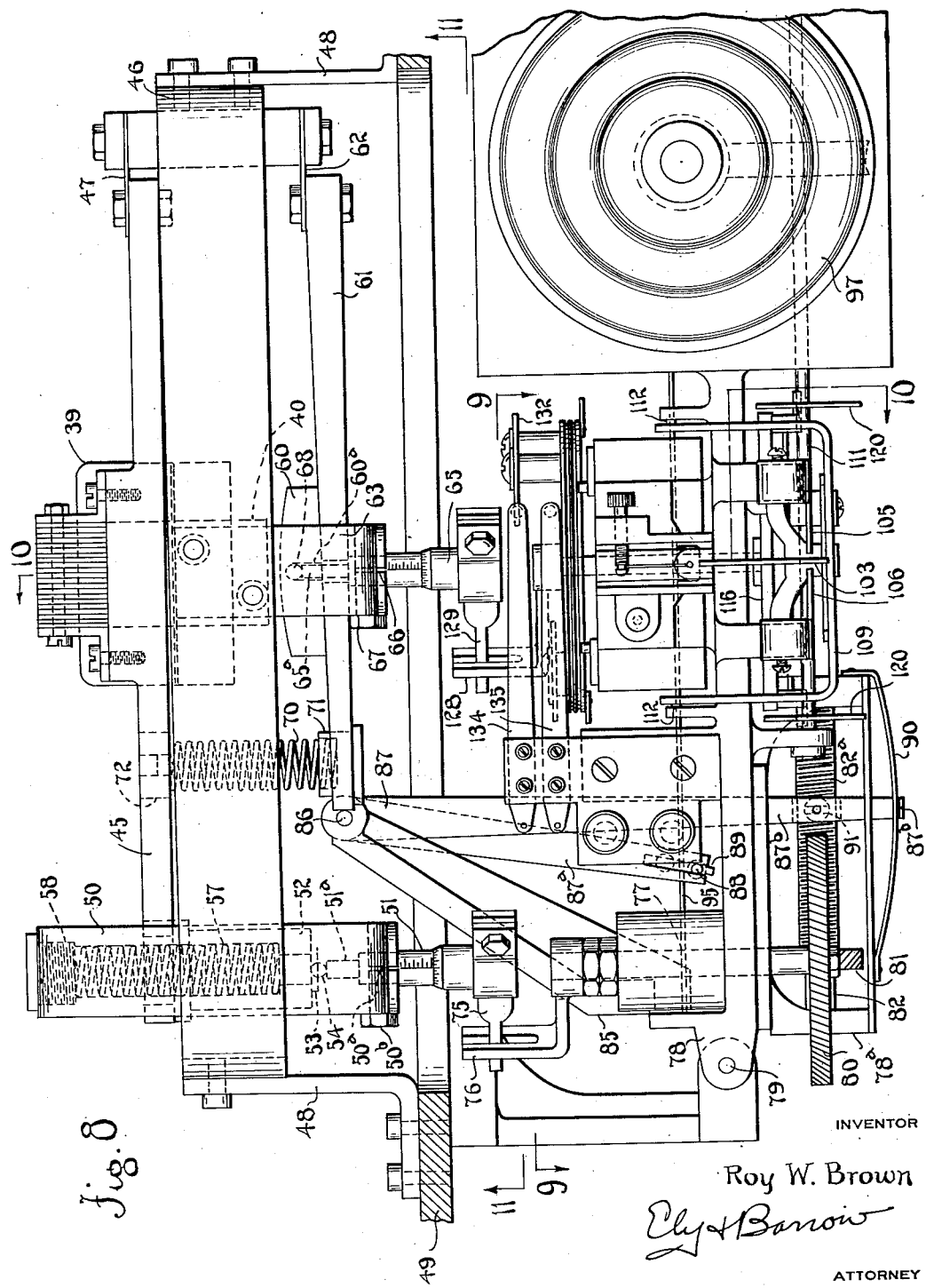
INVENTOR
Roy W. Brown
ATTORNEY

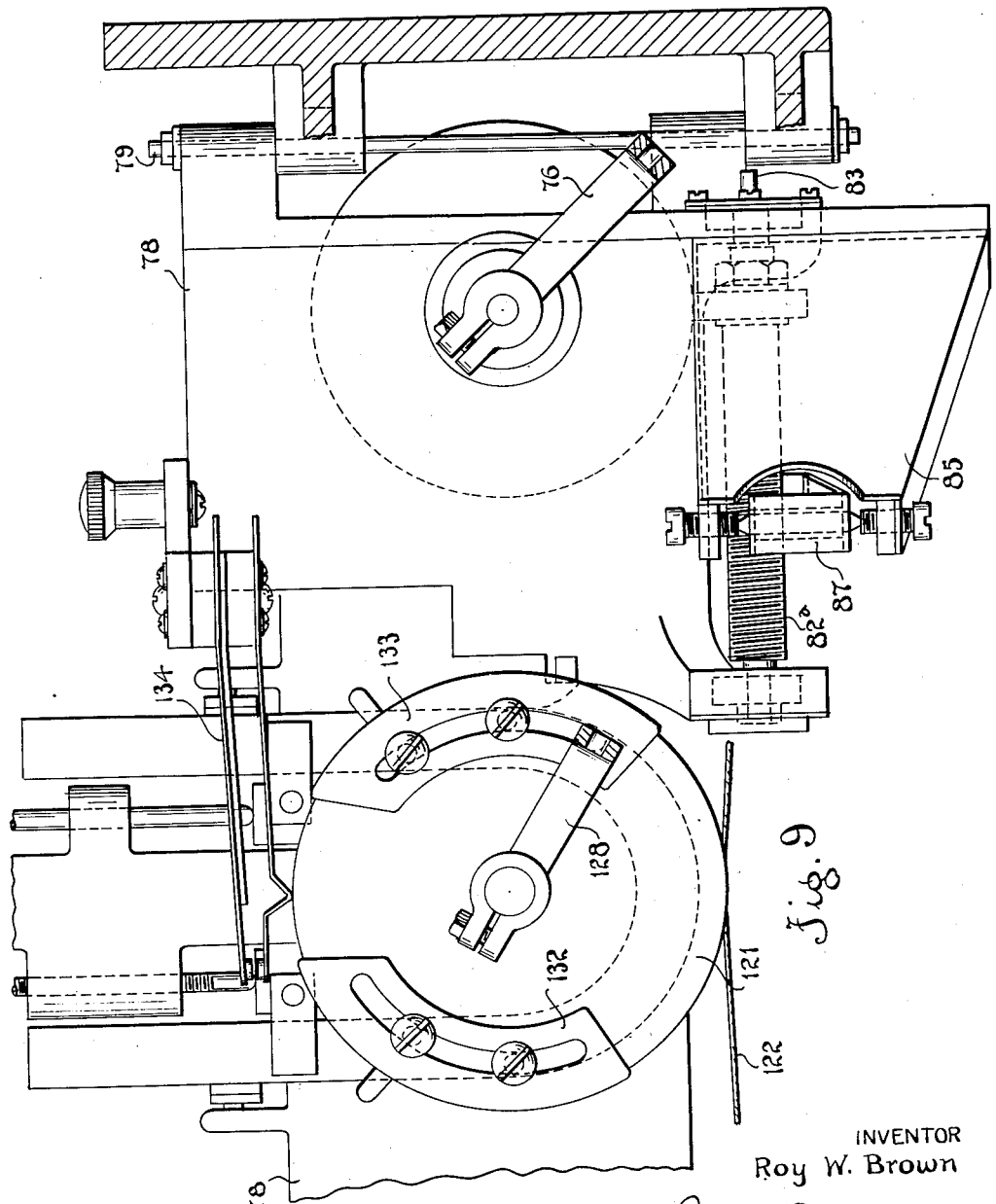

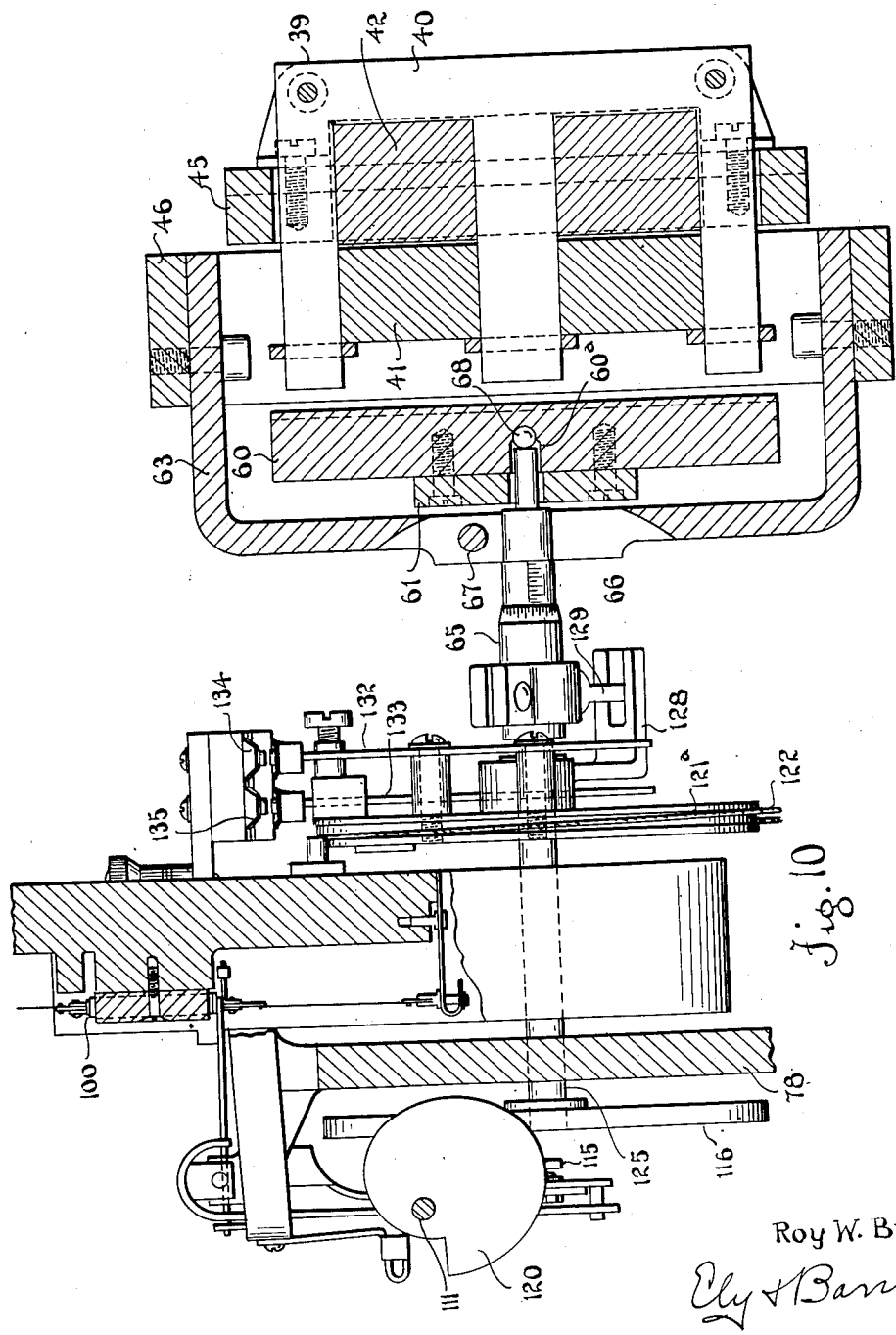

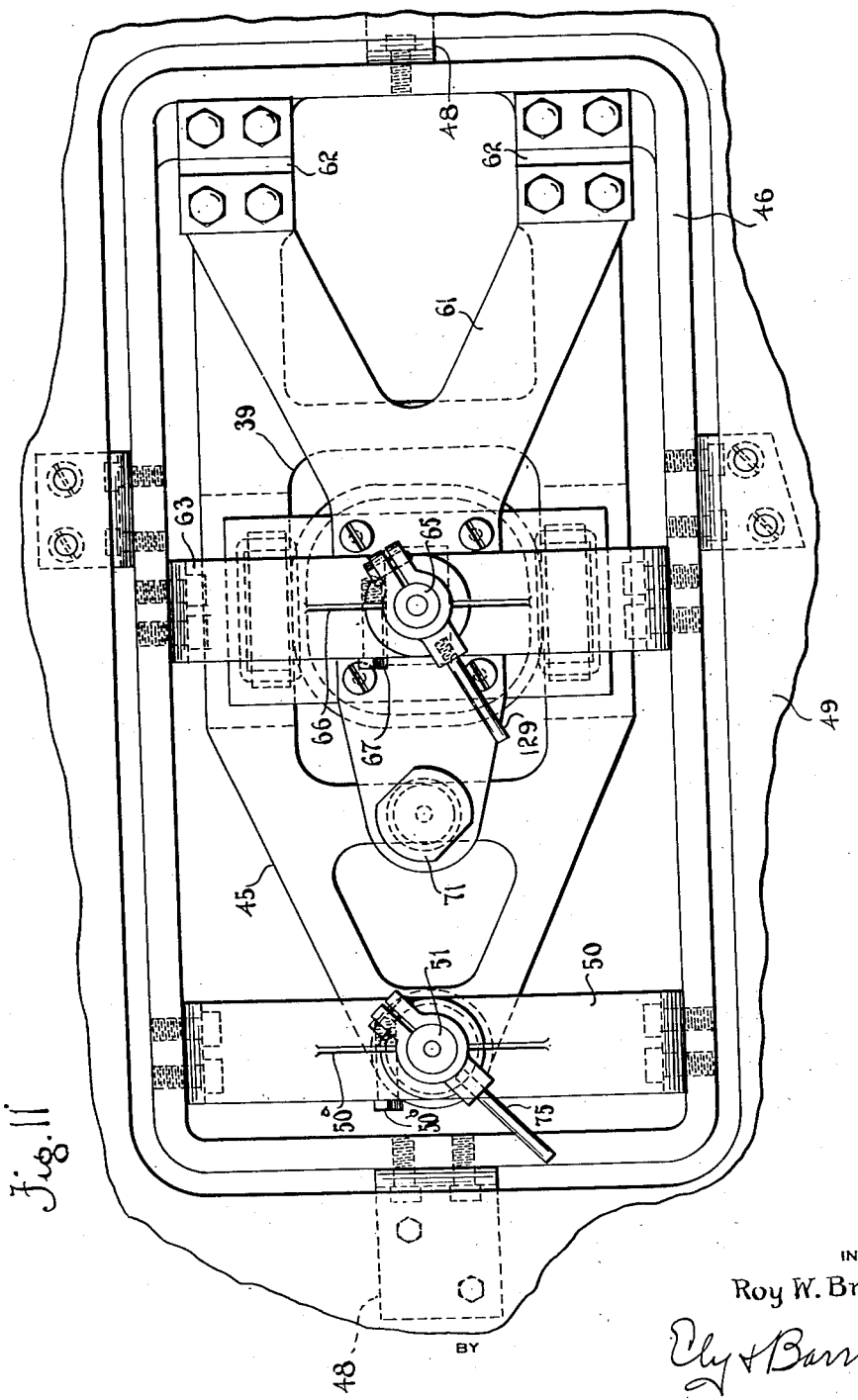

Aug. 18, 1936.    R. W. BROWN    2,051,780
MAGNETIC THICKNESS GAUGE
Filed Dec. 3, 1931    8 Sheets-Sheet 8
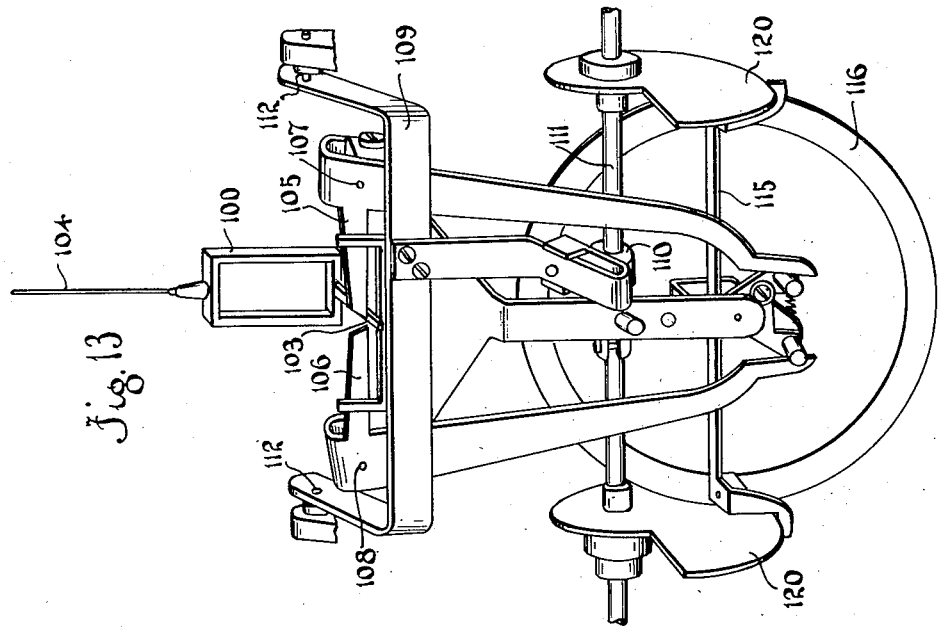
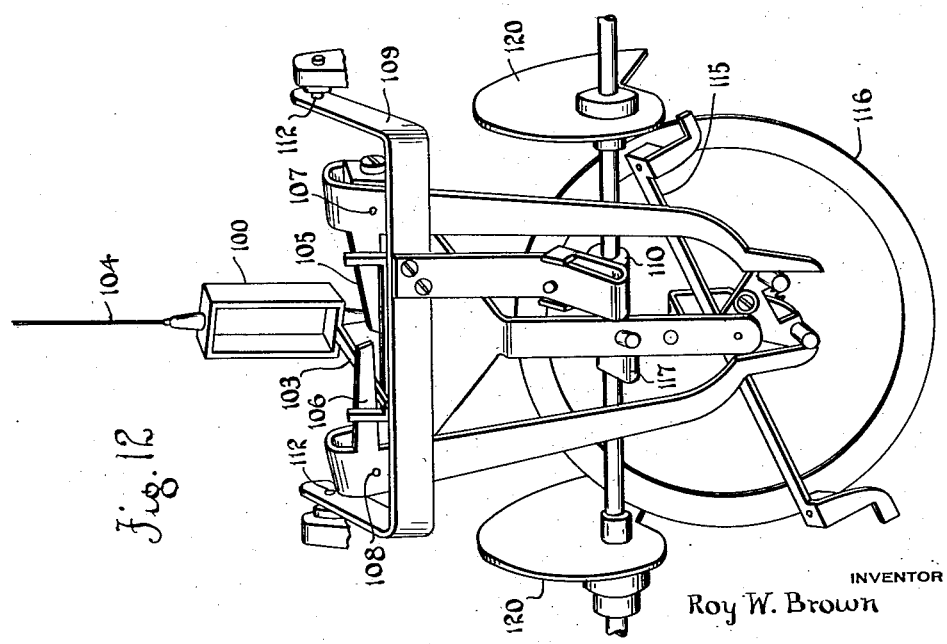
INVENTOR
Roy W. Brown
BY
Ely & Barrow
ATTORNEYS Patented Aug. 18, 1936

2,051,780

UNITED STATES PATENT OFFICE 2,051,780

MAGNETIC THICKNESS GAUGE

Roy W. Brown, Akron, Ohio, assignor to The Firestone Tire & Rubber Company, Akron, Ohio, a corporation of Ohio Application December 3, 1931, Serial No. 578,624

15 Claims. (Cl. 177—351)

This invention relates to thickness gauges for use on non-magnetic materials such as rubber, paper, etc., and especially sheet materials of this character during the course of their manufacture.

The chief object of the invention is to provide an accurate gauge adapted to measure, indicate and record the thickness and variations in the thickness in sheet material during the course of their manufacture.

A further object is the provision of a gauge in combination with means for driving sheet material, such as a calender roll for rubber, paper, cellulose or the like, whereby the material will be continuously gauged without requiring stopping of the roll or removal of portions of the material for gauging purposes as has been the common practice heretofore.

Again an object of the invention resides in the provision of means for supporting the gauging means in spaced relation with the surface of the material measured.

It is also an object of the invention to provide measuring and indicating means which register uniformly the deviations in thickness of the material regardless of the initial thickness thereof.

The foregoing and other objects of the invention are achieved by the apparatus illustrated in the accompanying drawings and described below. It is to be understood that the invention is not limited to the specific form thereof shown and described.

In the drawings:

Figure 2 is an enlarged view of the gauge means shown in Figure 1.

Figure 3 is a plan view of the gauge means of Figure 2.

Figure 4 is a detail front elevation partly broken away of the gauge unit, spaced adjacent a sheet of material shown on a calender roll (both the latter in section).

Figure 5 is a bottom plan of the gauge unit, partly broken away to show the interior construction of the unit.

Figure 8 is a plan view partly broken away of the recording and thickness setting means.

Figure 9 is a sectional view taken on line 9—9 of Figure 8.

Figure 10 is a sectional view taken on line 10—10 of Figure 8.

Figure 11 is a sectional view taken on line 11—11 of Figure 8.

Figures 12 and 13 are perspective views of the balancing galvanometer incorporated in the invention.

Figure 1:
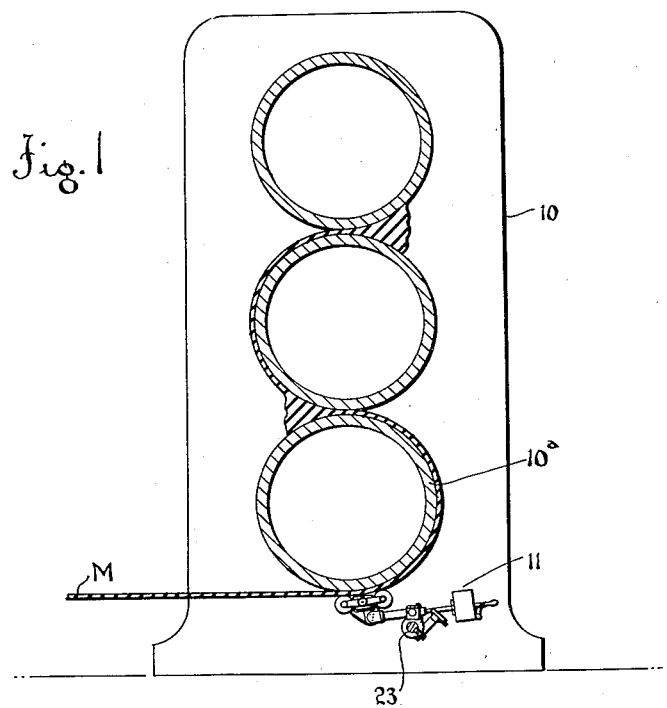
Figure 1 is a vertical sectional view of a calender having a gauge embodying the invention mounted thereon.

In general the invention contemplates the formation of a magnetic gap in the core of a transformer by means of the material to be gauged and the measuring of said gap by means of a second transformer having an armature adapted to adjust itself to maintain a magnetic gap in its own core of the same width as that maintained by the material in the first transformer core. Mechanical means controlling the movement of the armature of the second transformer are also connected to indicating and recording instruments which show the thickness and variations of the material being gauged.

The numeral 10 indicates a calender upon which a non-magnetic material M is sheeted. A gauging unit 11 contacts upon the surface of the material M which lies against the surface of a magnetizable calender roll 10ª. As illustrated in Figures 2 to 5 the gauging unit includes an open core transformer 12 having a transformer core 13 about which is wound a primary coil 14 and a secondary coil 15. The transformer 12 is preferably carried spaced slightly above the surface of the material M by means of a rolling carriage including a non-magnetizable box 16 to the ends of which are fixed stub axles 17 journaling wheel arms 18 which rotatably carry wheels 19 at their ends. The box 16 containing the transformer 12 is pivotally supported on a U-shaped bracket 20 carried at the end of an arm 21 which is pivotally supported on a bracket 22 feathered on a shaft 23 fixed parallel to the calender roll 10ª. A rack 24 fixed to the shaft 23 cooperates with a pinion 25 journaled on the bracket 22 and operated by a handwheel 26 to move the bracket 22 and thus the gauge unit back and forth along the shaft 23 and along the surface of the calender roll. A clamp 27 may be provided to lock the bracket and unit in the desired position.

The arm 21 is extended as at 28 and carries a counterweight 30 which is adjusted to lightly but firmly hold the carriage rollers with predetermined force against the material M on the calender roll 10ª. To hold the gauge unit in an inoperative position a curved rack 31 may be provided on the bracket 22 which cooperates with a toothed rod 32, sliding in the arm 28, and controlled by a bell lever 33.

The wheels, carriage arms and any other parts of the gauge unit supporting means which would tend to change the distance between the surface of the rubber and the gauge unit due to changes in temperature are constructed of invar or other metal not affected by changes in temperature. It will be seen that by providing a four-point pivotal support for the gauge unit, any lumps, irregularities or the like in the material measured will only cause one or perhaps two of the wheels to raise which will tend to make the gauge read closer to the actual thickness of the material.

Figure 7:
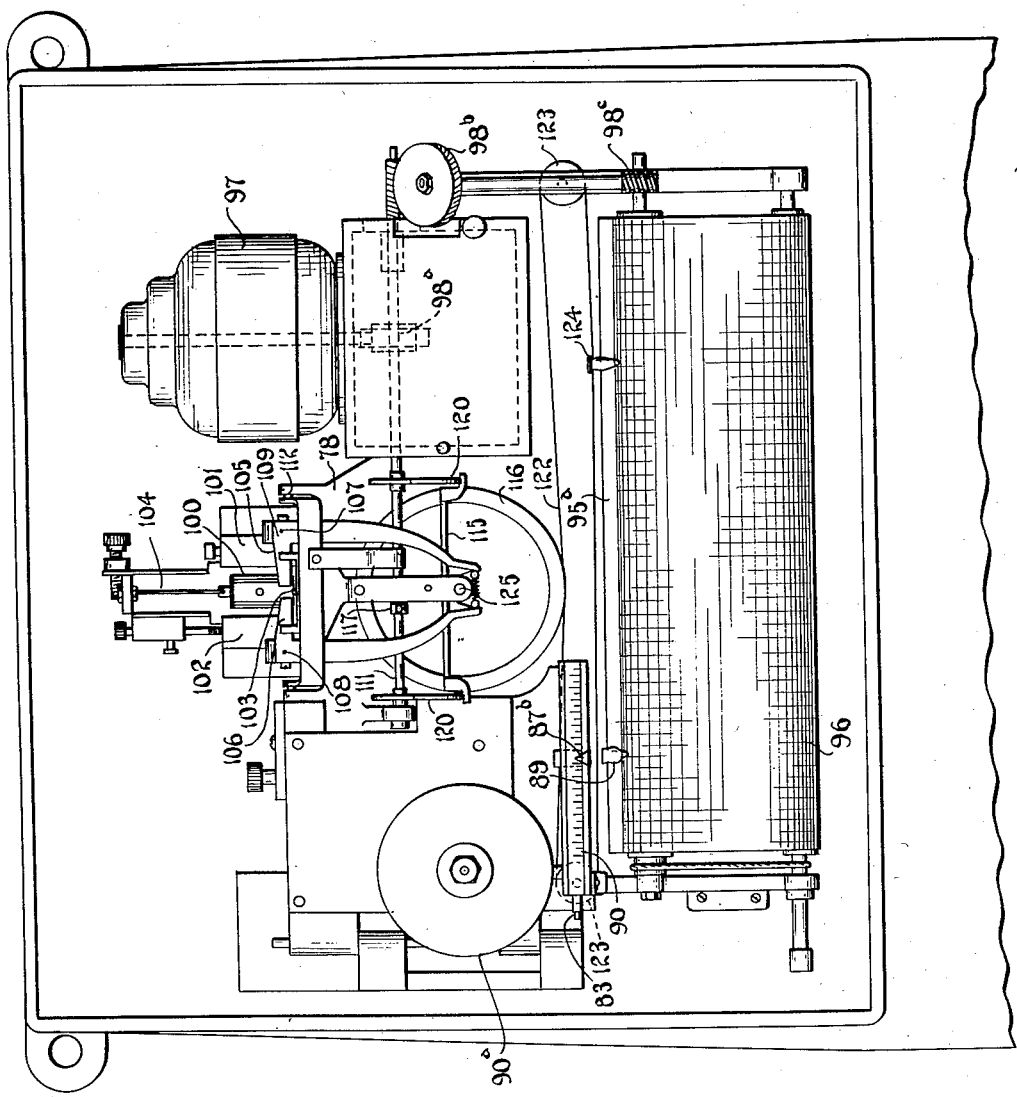
Figure 7 is a front elevation of the recording and thickness setting means embodying the invention.

The second or balancing transformer indicated generally at 39 is mounted in the recording and indicating instrument shown in elevation in Figure 7 and includes core 40 and primary and secondary windings 41 and 42, all of which are identical with those of the transformer 12 carried by the gauging unit and described above. The transformer 39 as seen in Figures 8, 10 and 11 is mounted on a member 45 which is pivotally supported at one end to an O-shaped frame 46 through the agency of flexible plates 47. The frame 46 is fastened by brackets 48 to a flange 49 of the instrument case. An O-shaped bracket 50 transversely fastened to the frame 46 supports a micrometer screw 51. The bracket is slotted as at 50ª to allow a screw 50ᵇ to clamp the bracket 50 about the casing of the micrometer screw. The end of the member 45 is tapped to receive an elongated socket 52 which in turn carries a ball cup 53 serving to hold a ball 54 between the end of the micrometer shaft 51ª and the socket 52. A spring 57 received at one end in the socket 52 and at the other by a cup 58 in the bracket 50 serves to yieldingly hold the member 45 against the micrometer screw 51.

The magnetic core of the transformer 39 is partially and variably completed by an armature 60 mounted on a Y-shaped member 61 which is pivotally supported on the frame 46 by flexible plate 62. A U-shaped bracket 63 fixed to the frame 46 clampingly supports a micrometer screw 65. This may be accomplished by providing a hole through the bracket to receive the casing of the micrometer screw and slotting the sides of the bracket as at 66 so that a screw 67 through the bracket will clamp the micrometer screw casing in place. The armature 60 is recessed at 60ª to receive a ball 68 which frictionlessly engages with the shaft 65ª of the micrometer 65.

A coil spring 70 is held between a cup 71 on the member 61 and a cup 72 on the member 45 in order to yieldably hold the armature 60 against the micrometer screw 65ª and to keep the armature 60 as far as possible from the core 40 of the transformer 39.

The micrometer screw 51, controlling the position of the member 45 and thus the position of the transformer 39, is adapted to be set by hand means. Such means may include a finger 75 fixed at the end of the micrometer screw 51 which engages with a fork 76 carried at the end of a shaft 77 journaled in an instrument-carrying frame 78 pivotally supported at 79 to the instrument case. A gear 80 keyed to the shaft 77 meshes with a worm 81 carried on a shaft 82 journaled in brackets 78ª of the frame 78. The end of the shaft 82 is extended as at 83 and shaped to engage with a key (not shown) whereby the shaft may be rotated to control the initial position of the transformer 39.

A bracket 85 secured to the frame 78 pivotally supports at 86 a bell lever 87, one arm 87ª of which is forked to slidably engage with a stud 88 projecting from the top of a recording pen 89. The other arm 87ᵇ of the bell lever 87 is extended to register with a scale 90 and the shaft 82 is provided with a threaded portion 82ª which cooperates with a stud 91 carried by the arm 87ᵇ so that turning the shaft 82 by the key not only adjusts the initial position of the transformer 39 but indicates the position thereof by the scale 90 and the pointer 87ᵇ and also changes the position of the recording pen 89.

The recording pen 89 is slidably carried on a guide 95 so that it engages with a chart 96 driven at a uniform rate by a motor 97 through suitable gearing 98ª, 98ᵇ and 98ᶜ so that a permanent record may be made.

The micrometer screw 65 which controls the position of the armature 60 is operated by a balancing galvanometer of a known type. This is briefly described as follows, particularly in conjunction with Figures 12 and 13: A galvanometer coil 100 is mounted between poles 101 and 102 of a magnet and carries a pointer 103. The movements of the galvanometer coil 100, which swings about the vertical axis 104, are controlled by the electrical conditions which are present from time to time in the measuring circuit of the recorder. When the galvanometer system is at its position of rest (i. e., the measuring circuit is balanced), the galvanometer pointer 103 lies directly under the space between the ends of the two right-angle levers 105 and 106, which are held pivoted at 107 and 108. From this position of rest the galvanometer system may deflect under the influence of current in the galvanometer, until its pointer lies at any position between the stops at the two ends of the rocker arm 109.

By the cam 110 on the motor-driven shaft 111, the rocker arm, which is pivoted at 112, is periodically raised, and as it is raised it picks up the end of the galvanometer pointer and lifts it. If, at that instant, the galvanometer is balanced the pointer is raised into the space between the two levers 105 and 106. If, however, as the rocker arm is raised the galvanometer is unbalanced and its pointer lies under one or the other of the right-angle levers 105 and 106, which are pivoted at 107 and 108, the pointer, as it is raised, carries up with it the horizontal side of one of these right-angle levers.

The resultant position of the parts of the mechanism due to this movement is shown as a typical case in Figure 12. The arm 115, which is tilted from its horizontal position shown in Figure 13 to the position shown in Figure 12, is one member of a clutch whose other member is the disc 116, and at the instant the above movements took place the members 115 and 116 were held apart by the cam 117 on the motor-driven shaft. As the rocker arm 109 falls, the clutch members 115 and 116 come into engagement, and the cams 120, rotating, engage with extensions of arm 115 and restore it to its original position, carrying the disc 116 with it.

The amount of rotation given to arm 115 and to disc 116 depends on the extent of the galvanometer deflection, since the pointer approaches the fulcrum of the lever as the deflection increases. Consequently the re-balancing movement will be large or small as the unbalance is large or small.

The shaft 125 upon which disc 116 of the clutch mechanism is mounted extends through and is journaled in the frame 78 and carries the pulley 121 having a spiral groove 121ᵃ. A flexible cord 122 wound about the pulley 121 is passed over a pair of idler pulleys 123 journaled as shown in Figure 7 at opposite ends of the frame 78 and the ends are attached to a second recording pen 124, slidably carried on the guide 95a, which cooperates with the moving chart 96 to make a permanent record of the actual thickness of the material.

At the end of the shaft 125 is fixed a forked arm 128 which engages with a finger 129 fixed to the screw of the micrometer 65 so that when the shaft 125 is turned by the balancing galvanometer above described, the micrometer screw will be turned to move the armature 60 of the transformer 39 toward or from the core 40 thereof until the galvanometer circuit is balanced.

A pair of adjustable, arcuate cam plates 132 and 133 may be carried by, but spaced from the pulley 121 to engage a pair of switches 134 and 135 to indicate by electrical means, such as bell or light, the determined or desired limits of the movement of the galvanometer and thus the limits of the variation in thickness of the material M being measured.

Figure 6:
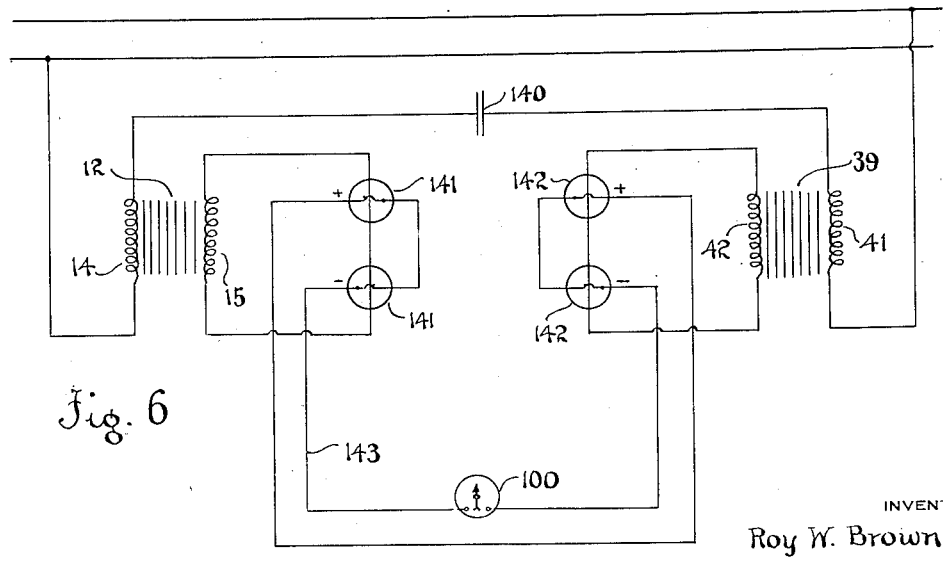
Figure 6 is a schematic wiring diagram of the various units of the invention.

The schematic wiring diagram of Figure 6 indicates the manner in which the various instruments are connected. The primaries of the transformers 12 and 39 are connected in series with each other and to a suitable source of alternating current. A condenser 140 is interposed in this circuit between said primaries to increase the galvanometer sensitivity, the condenser being calibrated to give maximum sensitivity for the range of gauges of rubber stocks operated upon. The secondaries of each of the transformers are connected in series to the heater wires of pairs of conventional vacuum thermocouples 141, 141 and 142, 142. While two thermocouples are shown, it will be understood that one or more thermocouples may be used according to the sensitivity desired. Fluctuations of the current flowing through each transformer secondary will thus cause fluctuations in the temperature of the hot junctions of the thermocouple and thus cause changes in the E. M. F. generated thereby. The junction circuits of the thermocouples are connected in series in bridge circuit 143 and with the galvanometer coil 100. The thermocouples are balanced against each other so that there will be no current flow in bridge circuit 143 when the currents in the secondary circuits are balanced. When there is an unbalanced condition, however, a current will flow in bridge circuit 143 actuating galvanometer coil 100.

In operation the gauge means 11 is placed against a piece of material of known thickness laid against the calender roll 10ᵃ. The measuring or thickness setting transformer 39 is now adjusted by turning the shaft 82 by means of a key fitted to the projection 83 of the shaft, until the air gap in the core or magnetic circuit of the transformer is identical with the gap caused by the material M between the core 13 of the transformer 12 and the roll 10ᵃ. At this time the galvanometer is on its zero or central position. Any change in thickness of material separating the gauging means 11 from the calender roll will cause the galvanometer to deflect with consequent movement of pen 124, thus indicating variation from the set position.

When it is desired to form the material M of a certain thickness the shaft 82 is turned by a key until the pointer of the arm 87ᵇ indicates that thickness on the scale 90. This operation has, of course, also adjusted the gap across the core of the transformer 39. The rolls of the calender are now adjusted until the galvanometer is balanced at which time the material will be of the proper thickness. Variations in the thickness of the material such as caused by a change in the plasticity of the material or change in the temperature of the rolls or of the material or jarring of the rolls closer together, etc., cause the core 13 of the transformer 12 to be brought closer to or further from the roll 10ᵃ. This changes the current induced into the secondary of the transformer 12 which causes greater or lesser currents to flow in thermocouple circuit 143 and galvanometer coil 100.

The motor 97 constantly drives the shaft 111, as well as the chart 96, and if the galvanometer pointer is out of balance it will move the disc 116, as described above, which moves the core completing armature 60 of the transformer 39 so that the gaps across the respective cores are again the same. Changing the position of the armature 60, of course also changes the position of the recording pen 124 through the agency of the pulley 121 and the cord 122. The chart 96 is graduated beneath the pen 124 to indicate and record the plus and minus deviations from the set thickness. In this manner the pen 89 on one side of the chart records the set thickness and the pen 124 the deviations therefrom. Lights or buzzers by means of switches 134 and 135 may warn the operator that certain limits in deviations from the desired thickness have been reached.

I should be noted here that the apparatus as originally calibrated can be used on stock of any initial or set thickness and that deviations from this set thickness will be uniformly and similarly recorded. For this reason the invention can be employed to measure material of varying thickness without change in the indicating scales.

While the invention is particularly adapted for use with a calender roll and with certain plastic materials, it will be understood that the invention contemplates employing the gauging means in conjunction with any non-magnetic sheet material moving over flat or curved surfaces which may or may not move with the sheet material.

As many changes could be made in the construction, it is intended that all matter contained in the above description or shown in the accompanying drawings shall be interpreted as illustrative only and not in a limiting sense, accordingly various modifications and applications of the invention can be resorted to without departing from the spirit of the invention or the scope of the appended claims.

What is claimed is:

1. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, the primaries of said transformers being connected in series to an alternating current supply, a normally balanced bridge circuit, the secondaries of said transformers being connected to said bridge circuit so that a difference in the gaps of the two transformers will unbalance said bridge circuit, and means operated by the unbalancing of the bridge circuit to move said adjustable armature to balance the bridge circuit.

2. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material, rolling means for mounting said transformer core in spaced relation with the surface of said non-magnetic material and an adjustable armature for partially completing the core of the other transformer, the primaries of said transformers being connected in series to an alternating current supply, a normally balanced bridge circuit, the current in the secondaries of said transformers affecting said balanced bridge circuit so that a difference in the gaps of the two transformers will unbalance said bridge circuit, and means operated by the unbalancing of the bridge circuit to move said adjustable armature to balance the bridge circuit.

3. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, means supporting said armature for movement towards its core, means supporting the core for movement towards the armature, means for moving the core any desired distance from the armature to set the gauge to an initial thickness, the primaries of said transformers being connected in series to an alternating current supply, a normally balanced bridge circuit, the secondaries of said transformers being connected to said bridge circuit so that a difference in the gaps of the two transformers will unbalance the bridge circuit, and means operated by the unbalancing of the bridge circuit to move said adjustable armature to balance the bridge circuit.

4. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material, rolling means for mounting said transformer core in spaced relation with the surface of said non-magnetic material, and an adjustable armature for partially completing the core of the other transformer, means supporting said armature for movement towards its core, means supporting the core for movement towards the armature, means for moving the core any desired distance from the armature to set the gauge to an initial thickness, the primaries of said transformers being connected in series to an alternating current supply, a normally balanced bridge circuit, the secondaries of said transformers being connected to said bridge circuit so that a difference in the gaps of the two transformers will unbalance the bridge circuit, and means operated by the unbalancing of the bridge circuit to move said adjustable armature to balance the bridge circuit.

5. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, the primaries of said transformers being connected in series to an alternating current supply, and means to which the secondaries of said transformers are connected to move the adjustable armature to maintain the gaps in the cores of the two transformers equal throughout variations in the thickness of the non-magnetic material.

6. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, the primaries of said transformers being connected in series to an alternating current supply, a normally balanced bridge circuit, the secondaries of said transformers being connected to said bridge circuit so that a difference in the gaps of the two transformers will unbalance the bridge circuit, and a balancing galvanometer operated by the unbalancing of the bridge circuit to move said adjustable armature to balance the bridge circuit.

7. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, means supporting said armature for movement towards its core, means supporting the core for movement towards the armature, means for moving the core any desired distance from the armature to set the gauge to an initial thickness, the primaries of said transformers being connected in series to an alternating current supply, a normally balanced bridge circuit, the secondaries of said transformers being connected to said bridge circuit so that a difference in the gaps of the two transformers will unbalance the bridge circuit, and a balancing galvanometer operated by the unbalancing of the bridge circuit to move said adjustable armature to balance the bridge circuit.

8. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, and means operated by the change in current induced into the transformer secondaries to move the adjustable armature to maintain the gaps of the cores of the two transformers the same throughout deviations in the thickness of the non-magnetic material.

9. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material, rolling means for mounting said transformer core in spaced relation with the surface of said non-magnetic material and an adjustable armature for partially completing the core of the other transformer, and means operated by the change in current induced into the transformer secondaries to move the adjustable armature to maintain the gaps of the cores of the two transformers and the same throughout deviations in the thickness of the non-magnetic material.

10. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, means supporting said armature for movement towards its core, means supporting the core for movement towards the armature, means for moving the core any desired distance from the armature to set the gauge to an initial thickness, and means operated by the change in current induced into the transformer secondaries to move the adjustable armature to maintain the gaps of the cores of the two transformers the same throughout deviations in the thickness of the non-magnetic material.

11. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material, rolling means for mounting said transformer core in spaced relation with the surface of said non-magnetic material, and an adjustable armature for partially completing the core of the other transformer, means supporting said armature for movement towards its core, means supporting the core for movement towards the armature, means for moving the core any desired distance from the armature to set the gauge to an initial thickness, and means operated by the change in current induced into the transformer secondaries to move the adjustable armature to maintain the gaps of the cores of the two transformers the same throughout deviations in the thickness of the non-magnetic material.

12. In combination in a thickness gauge, a material manipulating element of magnetic material, a non-magnetic material to be gauged supported thereon, a pair of similar transformers, said transformers being substantially mechanically and electrically identical, said transformers having open cores, one of said core being adapted to be partially completed through said element across the gap caused by the non-magnetic material and an adjustable armature for partially completing the core of the other transformer, a high resistance, the primaries of said transformers being connected in series with each other and with said high resistance to an alternating current supply, a normally balanced bridge circuit, the secondaries of said transformers being connected to said bridge circuit so that a difference in the gaps of the two transformers will unbalance the bridge circuit, and means operated by the unbalancing of the bridge circuit to move said adjustable armature to balance the bridge circuit.

13. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, and means operated by the change in current induced into the transformer secondaries to move the adjustable armature to maintain the gaps of the cores of the two transformers the same throughout deviations in the thickness of the non-magnetic material, the amount of movement of the armature being proportionate to the amount of deviation in the thickness of the non-magnetic material.

14. In combination in a thickness gauge, a material manipulating element of magnetic material, a non-magnetic material to be gauged supported thereon, a pair of similar transformers, said transformers being substantially mechanically and electrically identical, said transformers having open cores, one of said cores being adapted to be partially completed through said element across the gap caused by the non-magnetic material and an adjustable armature for partially completing the core of the other transformer, the primaries of said transformers being connected in series to an alternating current supply, a normally balanced bridge circuit, the secondaries of said transformers being connected to said bridge circuit so that a difference in the gaps of the two transformers will unbalance the bridge circuit, means operated by the unbalancing of the bridge circuit to move said adjustable armature to balance the bridge circuit, and means for setting the apparatus to gauge an initial thickness whereby means forming the non-magnetic material can be adjusted to form the material of that thickness.

15. In apparatus for magnetically gauging the thickness of non-magnetic material, the combination with a material manipulating element of magnetic material over which non-magnetic material may be continually passed, of a transformer having an open core, said core being adapted to be substantially closed and the magnetic circuit thereof completed through said element across the gap caused by said material, and a rolling means giving a flexible four-point support for mounting said transformer in spaced relation with the surface of said material, the rolling means being raised or lowered in accordance with the thickness of non-magnetic material for altering the magnitude of the magnetic gap, said four-point support affording means whereby local variations in thickness in said non-magnetic material will have a decreased effect in altering the position of the transformer with respect to the element of magnetic material, and consequently a decreased effect in the variation of the magnetic gap.

ROY W. BROWN.